United States Patent

(12) United States Patent
Li et al.

(10) Patent No.: US 12,354,013 B2
(45) Date of Patent: Jul. 8, 2025

(54) SYSTEMS AND METHODS FOR MASKED SELF-TRAINING OF UNSUPERVISED IMAGE CLASSIFICATION

(71) Applicant: Salesforce, Inc., San Francisco, CA (US)

(72) Inventors: Junnan Li, Singapore (SG); Chu Hong Hoi, Singapore (SG)

(73) Assignee: Salesforce, Inc., San Francisco, CA (US)

( * ) Notice: Subject to any disclaimer, the term of this patent is extended or adjusted under 35 U.S.C. 154(b) by 505 days.

(21) Appl. No.: 17/827,339

(22) Filed: May 27, 2022

(65) Prior Publication Data

US 2023/0359900 A1 Nov. 9, 2023

Related U.S. Application Data

(60) Provisional application No. 63/337,946, filed on May 3, 2022.

(51) Int. Cl.
*G06N 3/088* (2023.01)
*G06V 10/75* (2022.01)
*G06V 10/764* (2022.01)
*G06V 10/82* (2022.01)

(52) U.S. Cl.
CPC .......... *G06N 3/088* (2013.01); *G06V 10/751* (2022.01); *G06V 10/764* (2022.01); *G06V 10/82* (2022.01)

(58) Field of Classification Search
CPC ...... G06N 3/088; G06V 10/82; G06V 10/751; G06V 10/764
USPC ......................................................... 382/155
See application file for complete search history.

(56) References Cited

U.S. PATENT DOCUMENTS

| | | | |
|---|---|---|---|
| 2018/0267996 A1* | 9/2018 | Lin | G06T 11/60 |
| 2022/0391755 A1* | 12/2022 | Li | G06N 3/02 |
| 2023/0019211 A1* | 1/2023 | Wang | G06N 3/0464 |
| 2023/0106141 A1* | 4/2023 | Kalantidis | G06N 3/045 |
| | | | 706/15 |
| 2023/0360758 A1* | 11/2023 | Casale | G16H 50/20 |

* cited by examiner

*Primary Examiner* — Michael R Neff
(74) *Attorney, Agent, or Firm* — Haynes and Boone, LLP

(57) ABSTRACT

Embodiments described herein provide a masked self-training (MaST) which is an unsupervised learning approach leveraging two complimentary sources of supervision: pseudo-labels and raw image pixels. Specifically, MaST jointly optimizes three objectives to finetune a pre-trained classification model on unlabeled images: (1) self-training objective to learn global task-specific class prediction; (2) masked image modeling objective to learn local pixel-level information; (3) global-local feature alignment objective to bridge the knowledge learned from the two sources of supervision.

20 Claims, 13 Drawing Sheets

| Dataset | Train size | Test size | Metric | Description |
|---|---|---|---|---|
| ImageNet [36] | 1,281,167 | 50,000 | acc | 1000 categories of objects from WordNet concepts |
| SUN397 [37] | 76,129 | 21,758 | acc | 397 categories of indoor and outdoor scenes |
| Food101 [38] | 75,750 | 25,250 | acc | 101 categories of food dishes |
| GTSRB [39] | 26,640 | 12,630 | acc | 43 categories of German traffic signs |
| DTD [40] | 3,760 | 1,880 | acc | 47 categories of describable textures |
| UCF101 [41] | 9,537 | 3,783 | acc | 101 categories of human action video frames |
| Oxford Pets [42] | 3,680 | 3,669 | mean per class | 37 categories of cats and dogs |
| Caltech101 [43] | 3,060 | 6,085 | mean per class | 101 categories of objects and 1 background class |

FIG. 7

| | | ImageNet | SUN397 | Food101 | GTSRB | DTD | UCF101 | Average |
|---|---|---|---|---|---|---|---|---|
| ViT-B/16 | CLIP [1] | 68.3 | 64.4 | 88.7 | 43.4 | 44.7 | 68.8 | 63.1 |
| | MaST | 77.7 (+9.4) | 71.8 (+7.4) | 92.7 (+4.0) | 65.5 (+22.1) | 54.1 (+9.4) | 81.1 (+12.3) | 73.8 (+10.8) |
| | Supervised | 81.8 [44] | 77.2 | 90.3 | 97.1 | 78.6 | 82.3 | 84.5 |
| ViT-L/14 | CLIP [1] | 75.5 | 67.4 | 92.9 | 50.6 | 55.4 | 77.0 | 69.8 |
| | MaST | 82.1 (+6.6) | 74.6 (+7.2) | 95.3 (+2.4) | 68.7 (+18.1) | 62.6 (+7.2) | 85.7 (+8.7) | 78.2 (+8.4) |
| ViT-L/16 | Supervised | 85.4 [8] | 81.1 | 93.1 | 97.9 | 79.7 | 86.4 | 86.8 |

FIG. 8

|  | ImageNet | SUN397 | Food101 | GTSRB | DTD | UCF101 | Average |
|---|---|---|---|---|---|---|---|
| ST+MIM+Align (MaST) | 77.7 | 71.8 | 92.7 | 65.5 | 54.1 | 81.1 | 73.8 |
| ST+MIM | 77.1 | 70.7 | 92.4 | 62.5 | 52.6 | 79.2 | 72.4 (−1.4) |
| ST | 76.5 | 69.8 | 92.4 | 59.8 | 52.4 | 79.0 | 71.6 (−2.2) |

*FIG. 9*

| Num. [MSK] for $\mathcal{L}_{align}$ | ImageNet | SUN397 | Food101 | GTSRB | DTD | UCF101 | Average |
|---|---|---|---|---|---|---|---|
| All | 77.7 | 71.8 | 92.7 | 65.5 | 54.1 | 81.1 | 73.8 |
| Nearest-10 | 77.6 | 71.9 | 92.7 | 65.7 | 54.1 | 80.8 | 73.8 |

*FIG. 10*

|  | Pets | Caltech101 |
|---|---|---|
| CLIP | 88.9 | 89.8 |
| MaST w/o ImageNet warmup | 93.1 (+4.2) | 93.1 (+3.3) |
| MaST w/ ImageNet warmup | 94.3 (+5.4) | 93.7 (+3.9) |

*FIG. 11*

|  | ImageNet | SUN397 | Food101 | GTSRB | DTD | UCF101 | Average |
|---|---|---|---|---|---|---|---|
| ST w/ $\mathcal{L}_{reg}$ | 76.5 | 69.8 | 92.4 | 59.8 | 52.4 | 79.0 | 71.6 |
| ST w/o $\mathcal{L}_{reg}$ | 74.0 | 71.0 | 91.8 | 50.0 | 46.8 | 73.0 | 67.8 (−3.8) |

*FIG. 12*

| ImageNet-C [46] | CLIP | ST | MaST | MAE+Supervised [6] |
|---|---|---|---|---|
| mCE ↓ | 70.7 | 55.2 | 53.4 | 51.7 |
*FIG. 15*
| | ImageNetV2 | ImageNet-R | ImageNet-A |
|---|---|---|---|
| CLIP | 61.9 | 77.7 | 49.9 |
| Inductive MaST on ImageNet | 68.9 (+7.0) | 68.7 (−9.0) | 41.6 (−8.3) |
| Transductive MaST w/o ImageNet warmup | 64.7 (+2.8) | 87.3 (+9.6) | 56.9 (+7.0) |
| Transductive MaST w/ ImageNet warmup | 66.9 (+5.0) | 87.6 (+9.9) | 58.2 (+8.3) |
*FIG. 16*
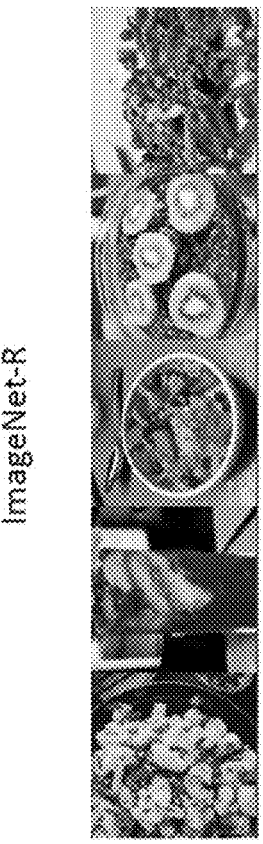
ImageNet
ImageNet-R
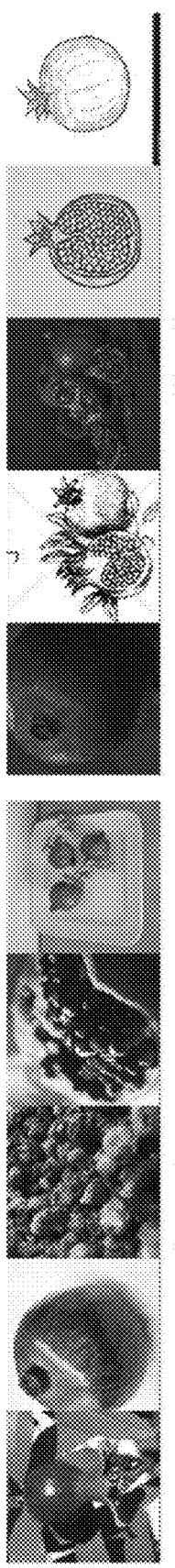
ImageNetV2
ImageNet-A
*FIG. 17*

| | ImageNet | | SUN397 | | Food101 | | GTSRB | | DTD | | UCF101 | | Pets | Caltech101 |
|---|---|---|---|---|---|---|---|---|---|---|---|---|---|---|
| | B | L | B | L | B | L | B | L | B | L | B | L | B | B |
| base lr | 2e-5 | 4e-5 | 1e-4 | 2e-4 | 2e-5 | 4e-5 | 2e-5 | 4e-5 | 2e-5 | 4e-5 | 1e-5 | 2e-5 | 1e-5 | 1e-5 |
| epoch | 30 | 20 | 20 | 20 | 40 | 40 | 20 | 20 | 60 | 60 | 60 | 60 | 60 | 60 |
| threshold $\tau$ | 0.7 | 0.5 | 0.4 | 0.3 | 0.7 | 0.7 | 0.3 | 0.2 | 0.4 | 0.5 | 0.5 | 0.6 | 0.7 | 0.7 |
| mask ratio | 0.3 | 0.3 | 0.1 | 0.1 | 0.1 | 0.1 | 0.5 | 0.3 | 0.1 | 0.1 | 0.1 | 0.1 | 0.1 | 0.1 |
| mask patch size | 32 | 56 | 32 | 28 | 32 | 56 | 32 | 56 | 32 | 56 | 16 | 14 | 32 | 32 |
| $\mathcal{L}_{align}$ weight $\lambda$ | 0.2 | 0.5 | 1 | 0.5 | 0.1 | 0.5 | 0.5 | 0.5 | 0.2 | 0.5 | 0.5 | 0.5 | 0.1 | 0.1 |
| EMA init. $\mu_0$ | 0.999 | | 0.99 | | 0.999 | | 0.99 | | 0.99 | | 0.99 | | 0.99 | 0.99 |
| EMA iters. $\mu_n$ | 2000 | | 500 | | 2000 | | 500 | | 100 | | 500 | | 100 | 100 |

*FIG. 18*

SYSTEMS AND METHODS FOR MASKED SELF-TRAINING OF UNSUPERVISED IMAGE CLASSIFICATION

CROSS REFERENCE(S)

The instant application is a non-provisional of and claims priority to U.S. provisional application No. 63/337,946, filed May 3, 2022, which is hereby expressly incorporated by reference herein in its entirety.

TECHNICAL FIELD

The embodiments relate generally to machine learning system such as computer vision models, and more specifically to systems and methods for masked self-training for unsupervised image classification.

BACKGROUND

Computer vision models are mostly trained with supervised learning using human-labeled images. For example, training images are manually annotated with a classification label. Such manual annotation can be time-consuming and costly, which limits the scalability of the trained computed vision models.

Therefore, there is a need for a more efficient way for training computer vision models.

BRIEF DESCRIPTION OF THE DRAWINGS

FIG. 7 is an example table providing information of example datasets of training image data, according to some embodiments described herein.

FIGS. 8-17 provide example performance charts of the MaST data experiments, according to some embodiments described herein.

FIG. 18 is an example table providing implementation parameters of the MaST framework, according to some embodiments described herein.

In the figures, elements having the same designations have the same or similar functions.

DETAILED DESCRIPTION

As used herein, the term "network" may comprise any hardware or software-based framework that includes any artificial intelligence network or system, neural network or system and/or any training or learning models implemented thereon or therewith.

As used herein, the term "module" may comprise hardware or software-based framework that performs one or more functions. In some embodiments, the module may be implemented on one or more neural networks.

Zero-shot image classification, e.g., a computer vision model performing an image classification task without being trained on images of a particular classification label, can often be challenging, because the task marks the capability of a model to solve tasks without human supervision. Recently, vision-language pre-training has been operated on open-vocabulary zero-shot classification, where it leverages web-scale image-text pairs to train image and text encoders that can be transferred to downstream tasks through natural language prompting. However, the zero-shot performance of vison-language pre-training is often inadequate for real-world adoptions. On the other hand, there are abundant unlabeled data available for many tasks training.

In view of the need for efficient computer vision learning, embodiments described herein provide a masked self-training (MaST) which is an unsupervised learning approach. The MaST framework employs two complimentary sources of supervision: pseudo-labels generated from an unmasked image and raw image pixels of the masked portion of the raw image. Specifically, MaST jointly optimizes three objectives to finetune a pre-trained classification model on unlabeled images: (1) a self-training objective to learn global task-specific class prediction by comparing pseudo-labels generated from unmasked images and predicted labels from masked images; (2) masked image modeling objective to learn local pixel-level information by comparing predicted pixel values of the masked patches and raw pixel values of the masked patches; (3) global-local feature alignment objective to bridge the knowledge learned from the two sources of supervision (1) and (2).

In this way, image models may be trained without supervision but with improved performance accuracy in image classification.

Figure 1:
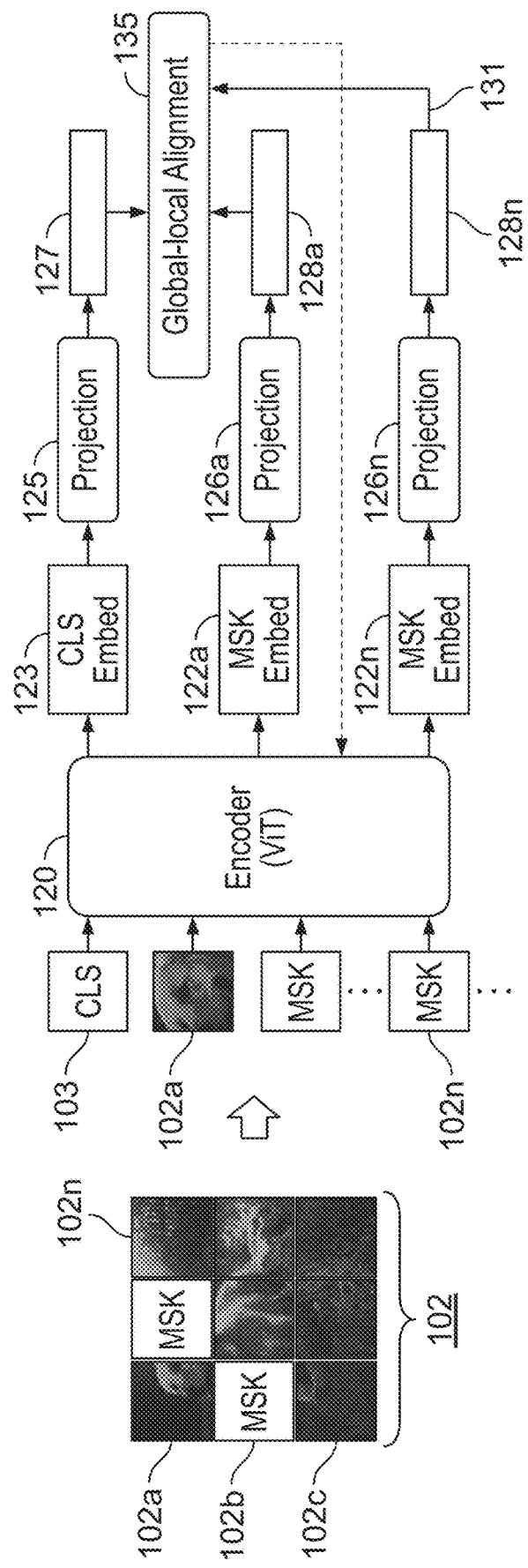
FIG. 1 is a simplified block diagram illustrating an example architecture for image classification training via global-local feature alignment, according to one or more embodiments described herein.

FIG. 1 is a simplified block diagram illustrating an example architecture for image classification training via global-local feature alignment, according to one or more embodiments described herein. In FIG. 1, a pre-trained image encoder 120 may be used to adapt to a downstream task using unlabeled images 102. For example, the input images 102 may have a size 224×224.

In one implementation, given a batch of B unlabeled training images, the input images may be augmented, e.g., using the RandomResized Crop+Flip+RandAug described in Cubuk et al., Randaugment: Practical automated data augmentation with a reduced search space, in proceedings of CVPR Workshops, 2020, while using Resize+RandomCrop as the weak augmentation to generate pseudo-labels as described in FIG. 3. During test, a center crop after resizing the shorter edge of the image to 224 may be applied to augment the testing image.

A (or the augmented version of the) training image b 102 may be divided into a plurality of non-overlapping patches 102a-n, which may be evenly sized or randomly sized. A [CLS] token 103 is appended to the plurality of image patches 102a-n to extract global information. The image patches 102a-n are then randomly masked by replacing a patch's embedding with a learnable [MSK] token.

For example, in one implementation, a patch-aligned random masking strategy where multiple s×s patches are randomly masked may be applied. In some examples, a low masking ratio (e.g., 10%) may be applied.

In one embodiment, the pretrained image encoder 120 may encode the [CLS] token 103, the unmasked image patches and the [MSK] tokens into a [CLS] embedding 123, the image embeddings (not shown in FIG. 1), and the [MSK] embeddings 122a, 122n, respectively. Let $z_b^c$ denote the output embedding 123 of the [CLS] token, which is then passed to a projection layer 125 to normalize the embedding 123, denoted by h. For example, the projection layer 125 may be a linear layer followed by $\ell_2$ normalization. Then the projection layer 125 outputs $v_b^c=h(z_b^c)$ as the normalized embedding 127.

In one embodiment, each [MSK] embedding (e.g., 122a or 122n) from the encoder 120 may be projected, by the same projection network h (e.g., 126a, or 126n respectively), to the same normalized space with the normalized [CLS] embedding 127: $v_b^m=h(z_b^m)$, resulting in normalized [MSK] embedding 128a or 128n, respectively. The global-local feature alignment module 135 then computes the global-local feature alignment loss as the average squared distance between the normalize embeddings of the [CLS] token 127 and the normalized embeddings of all [MSK] tokens (128a or 128n):

$$\mathcal{L}_{align} = \frac{1}{BM}\sum_{b=1}^{B}\sum_{m=1}^{M}\|v_b^c - v_b^m\|_2^2$$

where B denotes the number of training images in a training batch, and M denotes the number of masked patches per image. It is noted that the number of masked patches per image M can be the same or may vary per image.

In one embodiment, the global local alignment loss may be used to update the encoder 120, e.g., via the backpropagation path 131.

Figure 2:
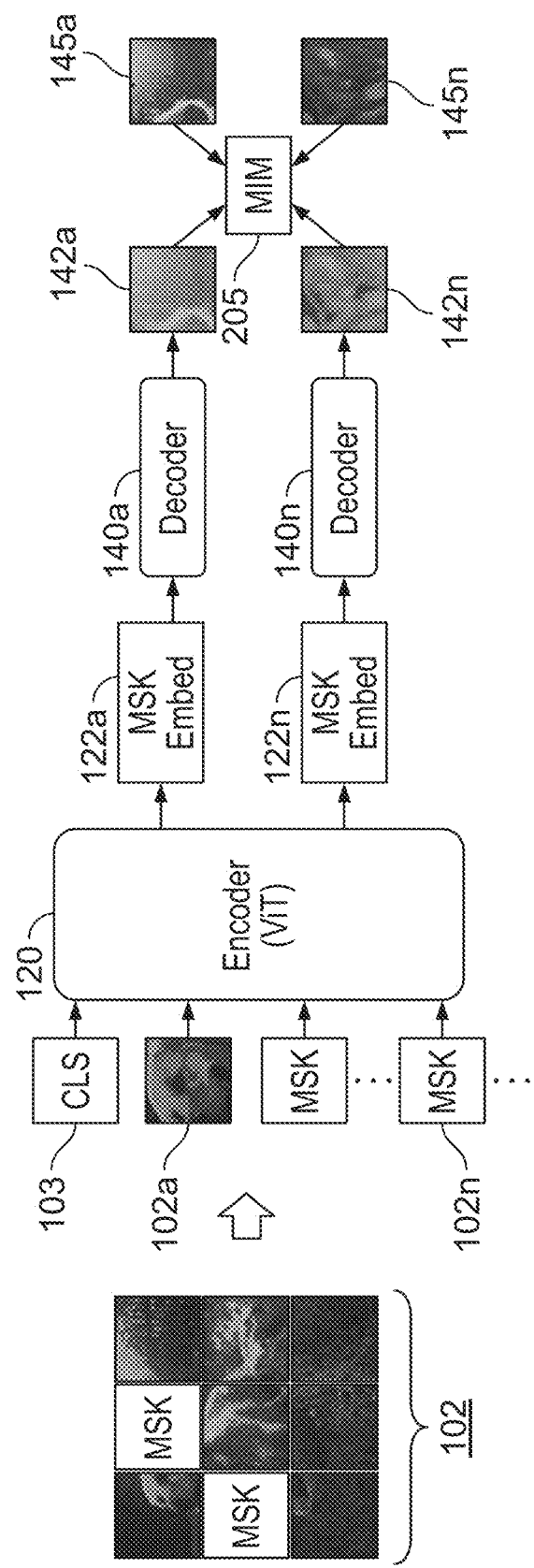
FIG. 2 is a simplified block diagram illustrating an example architecture for image classification training via masked image modeling (MIM), according to one or more embodiments described herein.

FIG. 2 is a simplified block diagram illustrating an example architecture for image classification training via masked image modeling (MIM), according to one or more embodiments described herein. Similar to the embodiment described in relation to FIG. 1, an unlabeled training image 102 may be divided into patches and randomly masked, and appended with a [CLS] token 103, which are all encoded by the encoder 120. In masked image modeling, local image representation at masked positions may be learnt by predicting the missing information using contextual patches, e.g., by predicting the RGB pixel values for masked patches.

Specifically, each output [MSK] embedding 122a or 122n, denoted by $z_b^m$ which corresponds to the m-th [MSK] token, is decoded by a respective linear decoder head 140a or 140n to obtain the predicted RGB values 142a or 142n. The predicted RGB values are denoted by $y_b^m \in \mathbb{R}^N$ for the respective masked patch, where N denotes the number of RGB pixels per patch. It is noted that the number of RGB pixels may vary per patch, due to the varying size of each image patch.

In one embodiment, the predicted RGB pixel values 142a, 142n may then be compared with the ground truth RGB values of the corresponding patches $x_b^m$ to compute the MIM loss as an $\ell_1$ loss:

$$\mathcal{L}_{mim} = \frac{1}{BMN}\sum_{b=1}^{B}\sum_{m=1}^{M}\|y_b^m - x_b^m\|_1,$$

where B denotes the number of images in the training batch, M denotes the number of masked patches per image and N denotes the number of RGB pixels per patch.

Figure 3:
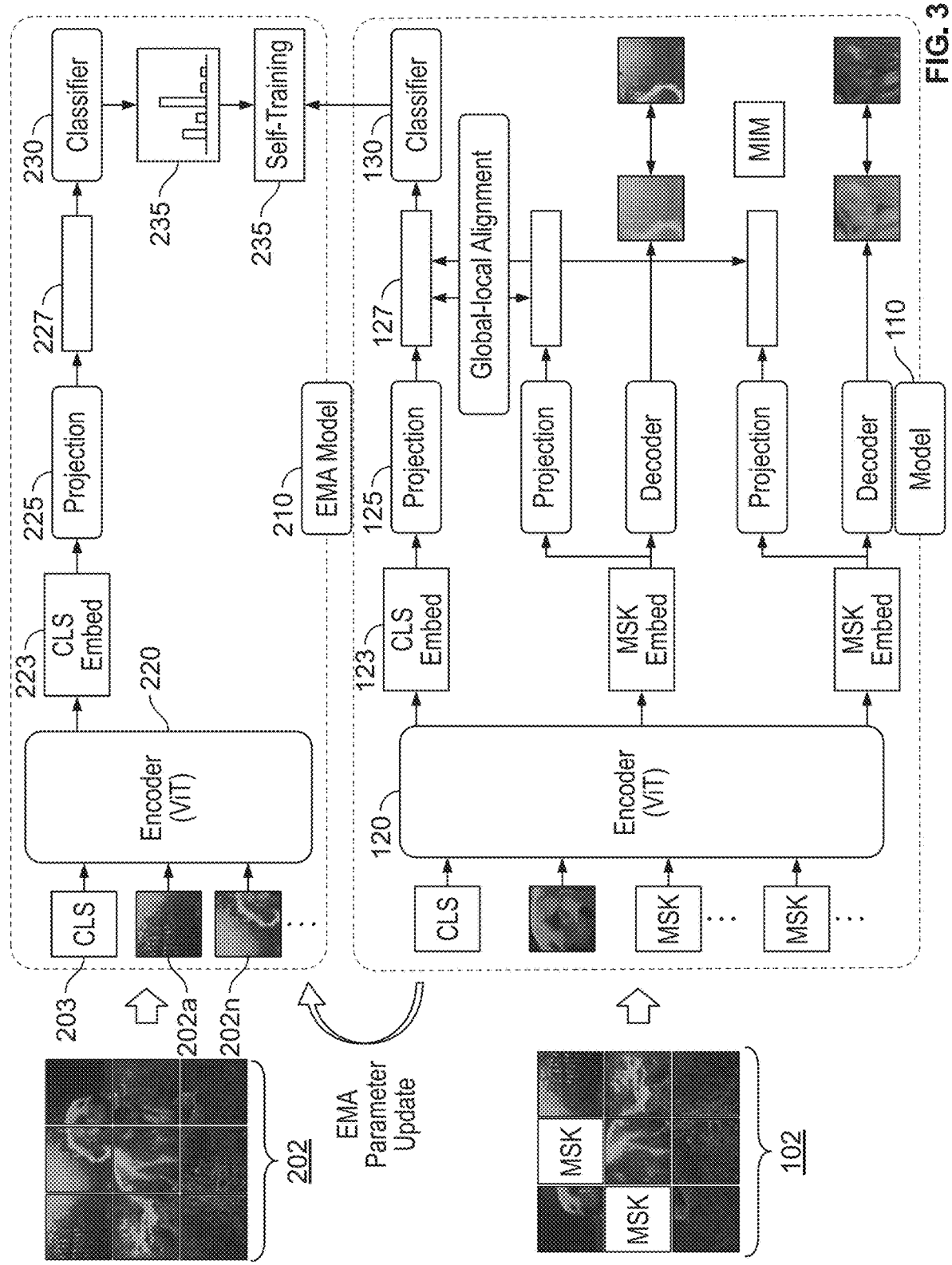
FIG. 3 is a simplified diagram illustrating an example overall framework of masked self-training (MaST), according to embodiments described herein.

FIG. 3 is a simplified diagram illustrating an example overall framework of MaST. according to embodiments described herein. Similar to the embodiments described in FIGS. 1 and 2, given an image 102, the image is divided into regular non-overlapping patches 102a-n. A [CLS] token 103 is appended to extract global information, which is used by a classifier 130 for prediction. Image patches are then randomly patched by replacing a patch's embedding with a learnable [MSK] token. The output embeddings of [CLS] and the embeddings of [MSK] are used to jointly optimize three objectives: (1) global self-training, (2) local masked image modeling as described in FIG. 2, and (3) global-local feature alignment as described in FIG. 1.

Specifically, within the model 110 comprising the encoder 120 and the decoders 140a-n, the normalized [CLS] embedding 127 is passed to a classifier 130, which multiple the embedding 127 with the classifier's weights to produce a prediction $p_b$ for self-training. The prediction $p_b$ is then compared with a pseudo-label for the training image 102, which is generated by passing a weakly-augmented version 202 of the image to a teacher model 210. The teacher model 210 comprises at least an encoder 220 similar to the encoder 120, and a projection layer 225 similar to the projection layer 125, and a classifier 230 similar to the classifier 130. Parameters of the teacher model 220 are given by an exponentially moving average (EMA) of the model parameters θ of the model 110. Thus, the parameters of the EMA teacher model 210 Δ including parameters for the encoder 220, the projection layer 225 and the classifier 30 are computed as:

$$\Delta = \mu\Delta + (1-\mu)\theta.$$

For the EMA, a linearly ramp-up of parameter decay rate μ from $\mu_0$ to 0.9998 in $\mu_n$ iterations.

Therefore, a weakly augmented version 202 of the image are similarly divided into a plurality of image patches 202a-n in a similar way as the original training image 102, e.g., into image patches of the same size. Without any masking, the plurality of image patches 202a-n and an appended [CLS] token 203 are encoded by the encoder 220. The [CLS] embedding 223 from the encoder 220 is then passed to the projection layer 225, which outputs a normalized [CLS] embedding 227. The normalized embedding 227 is then passed to the classifier 230 to generate the softmax prediction $q_b$, using as the pseudo-label 235. The pseudo label 235 $q_b$, and the prediction $p_b$ from the classifier 130 of model 110, are then compared to compute a cross-entropy loss:

$$\mathcal{L}_{cls} = \frac{1}{B}\sum_{b=1}^{B}\mathbb{1}(\max q_b \geq \tau)H(\hat{q}_b, p_b)$$

where the cross-entropy is computed only using pseudo-labels with maximum scores above a threshold τ and convert the soft labels $q_b$ into "one-hot" hard label by $\hat{q}_b=\text{argmax}(q_b)$.

In one embodiment, the pseudo-labels generated by the EMA teacher model 210 may often be biased towards certain classes. Thus, minimizing $L_{cls}$ alone would magnify the bias. To prevent this, a "fairness" regularization term may be used to encourage that on average, across a batch of samples, the model predicts each class with equal frequency:

$$\mathcal{L}_{reg} = -\frac{1}{K}\sum_{k=1}^{K}\log(\overline{p}_k),$$

where K is the total number of classes, and $\overline{p}$ is the model's average prediction across the batch. In cases where K>B, $\overline{p}$ is computed using moving average instead of batch average.

Thus, during training, the three objectives: MIM loss, self-training loss and the global-feature alignment loss may be jointly optimized via a weighted sum:

$$\mathcal{L} = \mathcal{L}_{cls} + \mathcal{L}_{reg} + \mathcal{L}_{mim} + \lambda \mathcal{L}_{align}$$

In this example, the tunable weight $\lambda$ is applied to the global-feature alignment loss $\mathcal{L}_{align}$, while keeping the weights for other losses as a constant of 1. In different implementations, each loss in the above over loss may be applied with a tunable weight.

In this way, by using the overall joint objective, the MIM objective may apply another source of supervision obtained from the raw images to alleviate the over-reliance on noisy pseudo-labels. Two sources of supervision (e.g., pseudo-labels and image pixels) can be bridged such that the local [MSK] features learned from the MIM loss may improve the global [CLS] feature for better classification performance.

Figure 4:
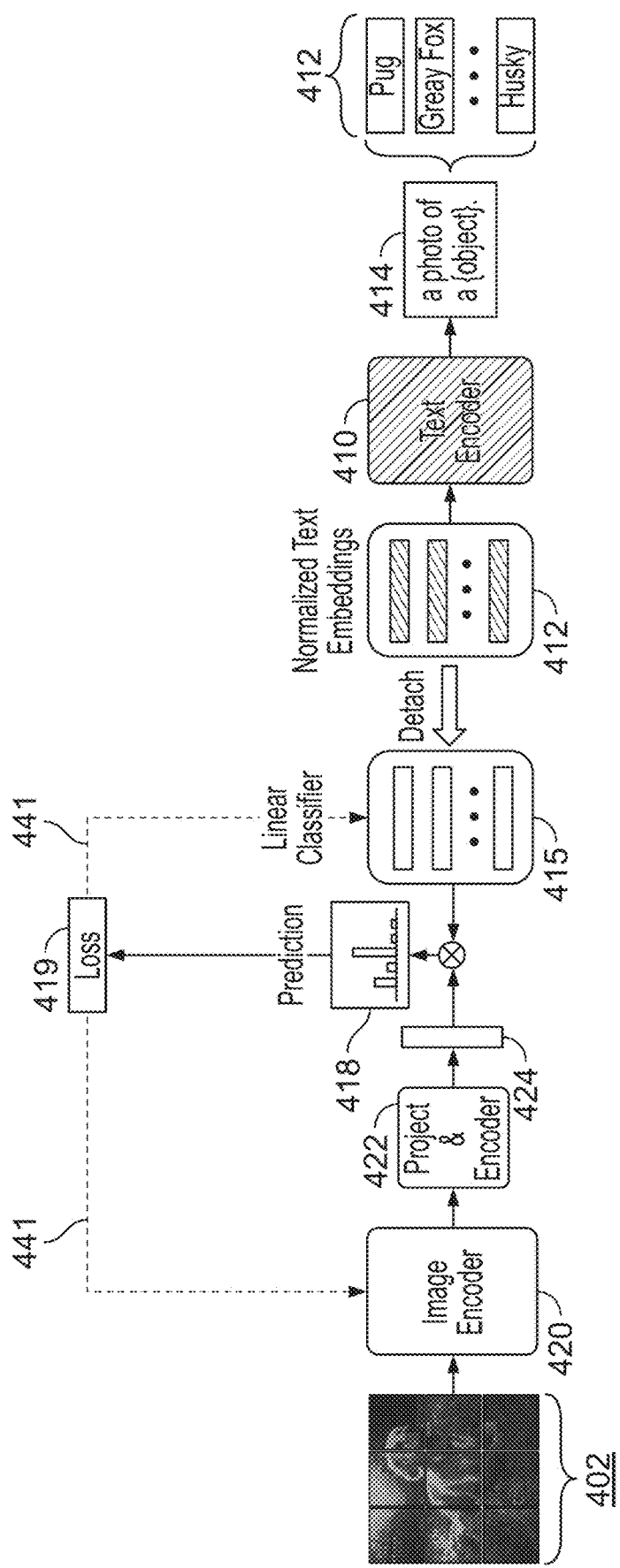
FIG. 4 is a simplified diagram illustrating an example structure of vision model pretraining to obtain the encoder and the classifier in the MaST framework described in FIGS. 1-3, according to embodiments described herein.

FIG. 4 is a simplified diagram illustrating an example structure of vision model pretraining to obtain the encoder and the classifier in the MaST framework described in FIGS. 1-3, according to embodiments described herein. As shown in FIG. 3, the MaST framework may adapt a pre-trained open-vocabulary classifier (e.g., classifier 130) to a downstream task using unlabeled images. The encoder 130 (and 230) and the classifier 130 (and 230) may be obtained from a pre-trained vision transformer as the model 110 to be adapted due to their distinctive zero-shot performance.

As shown in FIG. 4, an image encoder 420 and a text encoder 410 may be pre-trained with a contrastive loss such that paired images and texts have higher similarities in a shared embedding space. Specifically, a training image 402 is encoded by the image encoder 420 into image embeddings. The image embeddings are normalized by a projection (normalization) layer 422 into normalized image embeddings 424.

In order to perform zero-shot classification, a set of class names 412 to classify the image 402 are each paired with an ensemble of natural language prompts 414, e.g., a photo of a {object}. The resulting text description is encoded by the text encoder 410 into normalized text embeddings 412. The non-parametric text embeddings 412 are converted into weights of a linear classifier 415, and directly finetune the linear classifier 415 together with the image encoder 420 for unsupervised adaptation. For example, the normalized image embeddings 424 may be used to compute contrastive loss 419 against the output of the linear classifier 415. The loss 419 is then used to update the image encoder 420 and the linear classifier 415 via the backpropagation path 441.

Examples of the image encoder 420 may be obtained from the ViT model pretrained by the method described in CLIP (described in Radford et al., Learning transferable visual models from natural language supervision, in proceedings of International Conference on Machine Learning, 2021), e.g., ViT-B/16 and ViT-L/14, containing respectively 12 and 24 Transformer blocks with 768 and 1024 hidden dimension. The [MSK] token and linear decoder head are randomly initialized and finetuned together with the entire model. During finetuning, AdamW optimizer (described in Loshchilov et al., Decoupled weight decay regularization, arXiv preprint arXiv:1711.05101, 2017) may be used with a weight decay of 0.05. A cosine learning rate schedule may be adopted without any warmup. A layer-wise learning rate decay of 0.65 may be applied for both example ViT models. The batch size is 1024 for ViT-B/16 and 512 for ViT-L/14, and the learning rate is scaled linearly with the batch size (lr=base_lr×batchsize/256). 16 A100 GPUs may be used for the training.

During inference, the dot-product is taken between the normalized image embedding 424 and all text embeddings from the linear classifier 415 to produce the prediction logits for the input image.

Figure 5:
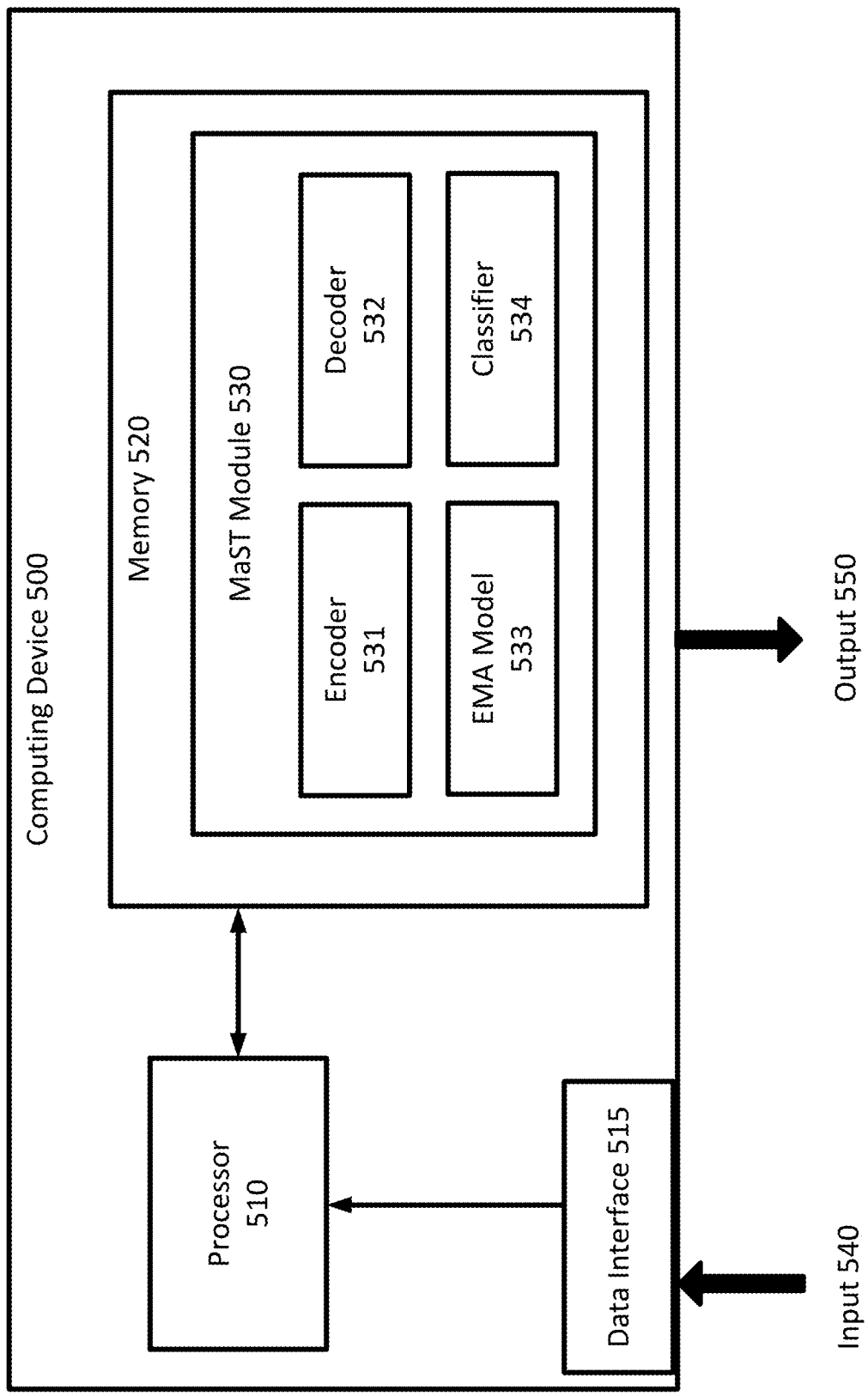
FIG. 5 is a simplified diagram of a computing device for implementing the MaST framework shown in FIG. 3, according to some embodiments.

FIG. 5 is a simplified diagram of a computing device 500 for implementing the MaST framework shown in FIG. 3, according to some embodiments. As shown in FIG. 5, computing device 500 includes a processor 510 coupled to memory 520. Operation of computing device 500 is controlled by processor 510. And although computing device 500 is shown with only one processor 510, it is understood that processor 510 may be representative of one or more central processing units, multi-core processors, microprocessors, microcontrollers, digital signal processors, field programmable gate arrays (FPGAs), application specific integrated circuits (ASICs), graphics processing units (GPUs) and/or the like in computing device 500. Computing device 500 may be implemented as a stand-alone subsystem, as a board added to a computing device, and/or as a virtual machine.

Memory 520 may be used to store software executed by computing device 500 and/or one or more data structures used during operation of computing device 500. Memory 520 may include one or more types of machine readable media. Some common forms of machine readable media may include floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Processor 510 and/or memory 520 may be arranged in any suitable physical arrangement. In some embodiments, processor 510 and/or memory 520 may be implemented on a same board, in a same package (e.g., system-in-package), on a same chip (e.g., system-on-chip), and/or the like. In some embodiments, processor 510 and/or memory 520 may include distributed, virtualized, and/or containerized computing resources. Consistent with such embodiments, processor 510 and/or memory 520 may be located in one or more data centers and/or cloud computing facilities.

In some examples, memory 520 may include non-transitory, tangible, machine readable media that includes executable code that when run by one or more processors (e.g., processor 510) may cause the one or more processors to perform the methods described in further detail herein. For example, as shown, memory 520 includes instructions for the MaST module 530 that may be used to implement and/or emulate the systems and models, and/or to implement any of the methods described further herein. A MaST module 530 may receive input 540 that includes an image input for a specific downstream task such as object identification, captioning, and/or the like via the data interface 515. The MaST module 530 may generate an output 550 such as an output for the downstream task.

In some embodiments, the MaST module 530 includes an encoder 531 (e.g., see the encoder 120 in FIGS. 1-3), a decoder 532 (e.g., see decoders 140a-n in FIG. 2), an exponentially moving average (EMA) model 533 (e.g., see EMA model 210 in FIG. 3), and a classifier 534 (e.g., see classifier 130 in FIG. 3). Functionalities of the submodules 531-534 may be similar to that described in relation to FIGS. 1-4. In one embodiment, the MaST module 530 and its submodules 531-534 may be implemented by hardware, software and/or a combination thereof.

Some examples of computing devices, such as computing device 500 may include non-transitory, tangible, machine readable media that include executable code that when run by one or more processors (e.g., processor 510) may cause the one or more processors to perform the processes of method. Some common forms of machine-readable media that may include the processes of method are, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Figure 6A:
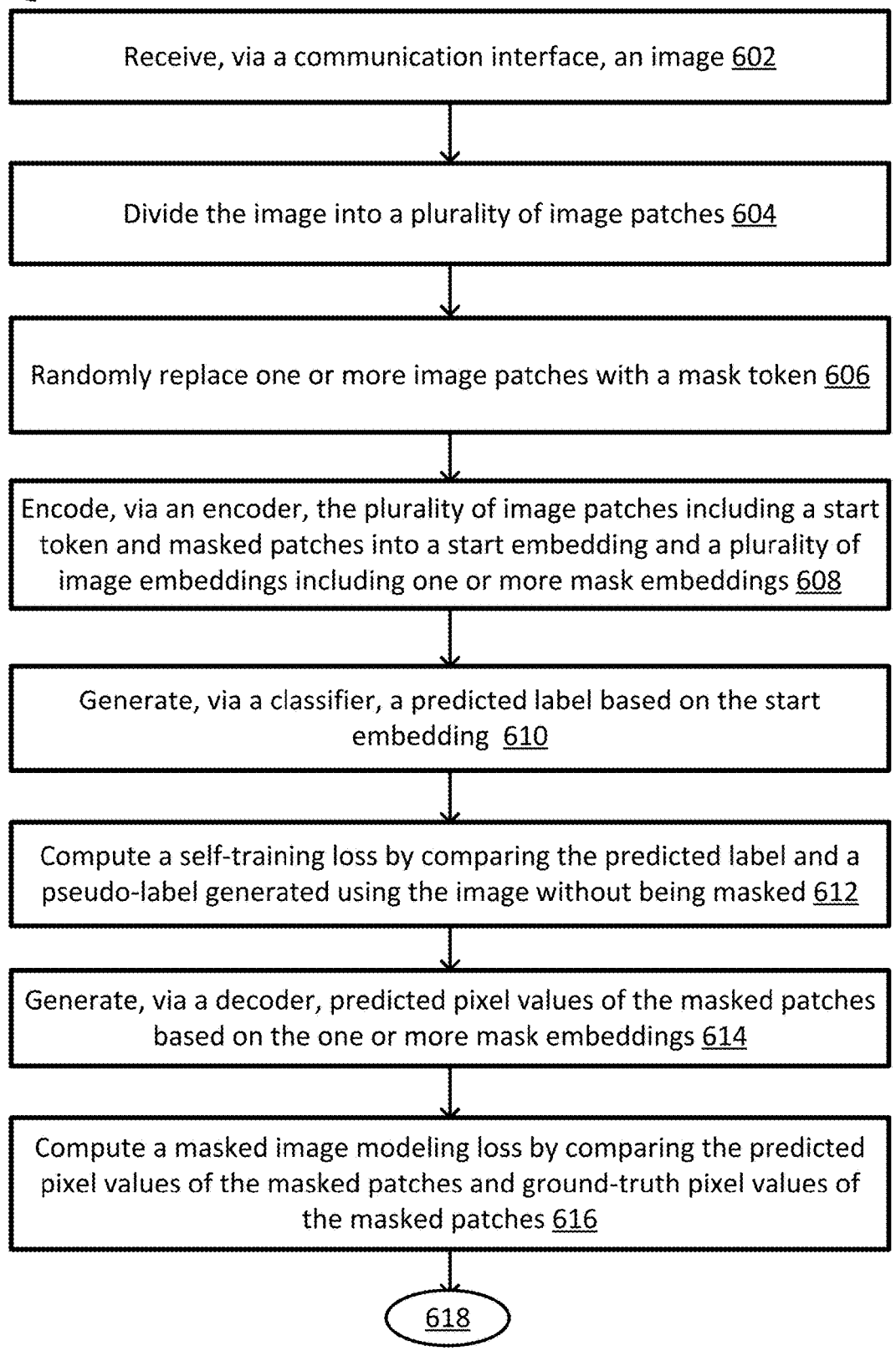
FIGS. 6A-6B provide a simplified logic flow diagram illustrating a method of masked self-training for image classification using the framework shown in FIG. 3, according to some embodiments described herein.
Figure 6B:
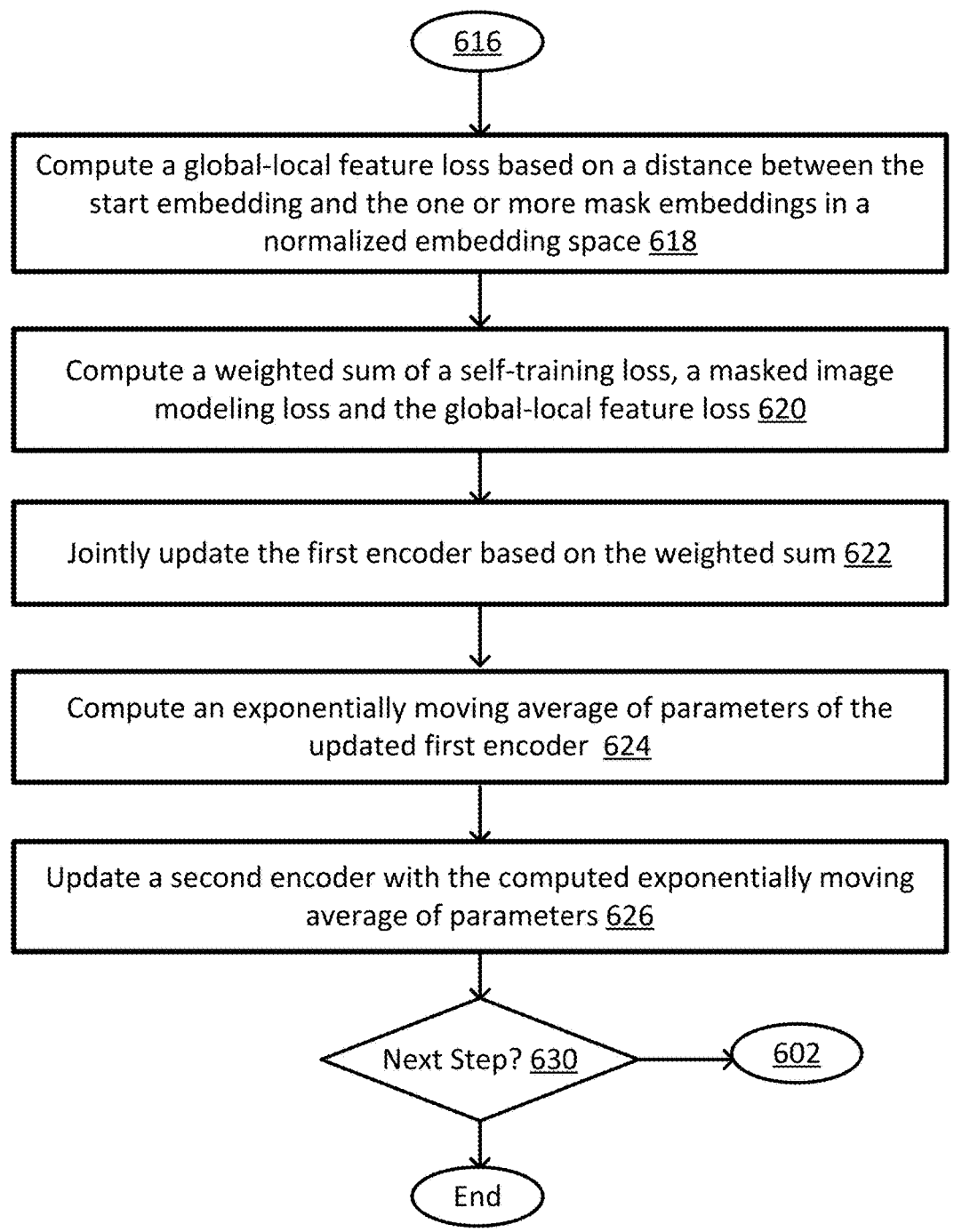

FIGS. 6A-6B provide a simplified logic flow diagram illustrating a method of masked self-training for image classification using the framework shown in FIG. 3, according to some embodiments described herein. One or more of the processes of method 600 may be implemented, at least in part, in the form of executable code stored on non-transitory, tangible, machine-readable media that when run by one or more processors may cause the one or more processors to perform one or more of the processes. In some embodiments, method 600 corresponds to the operation of the MaST module 530 (FIG. 5) for unsupervised image classification.

At step 602, a training image (e.g., 102 or 202 in FIGS. 1-3) may be received via a communication interface (e.g., 515 in FIG. 5).

At step 604, the image may be divided into a plurality of image patches (e.g., 102a-n or 202a-n in FIGS. 1-3).

At step 606, one or more image patches may be randomly replaced with a mask token, e.g., [MSK].

At step 608, an encoder (e.g., 120 in FIG. 1) may encode the plurality of image patches including a start token (e.g., [CLS] 103 in FIG. 1) and masked patches into a start embedding (e.g., 123 in FIG. 1) and a plurality of image embeddings including one or more mask embeddings (e.g., 122a, 122n in FIG. 1).

At step 610, a predicted label is generated by a classifier (e.g., 130 in FIG. 3) based on the start embedding (e.g., 127 in FIG. 3).

At step 612, a self-training loss may be computed (e.g., at module 235 in FIG. 3) by comparing the predicted label and a pseudo-label generated using the image without being masked. For example, in one implementation, a second encoder (e.g., 220 in FIG. 3) which may be a copy of the first encoder, may encode the plurality of image patches (e.g., 202a-n in FIG. 3) and a second start token (e.g., 203 in FIG. 3) into a second start embedding (e.g., 223 in FIG. 3). The second start embedding is then normalized, e.g., at the projection network 225 in FIG. 3. A second classifier (e.g., 230 in FIG. 3) which may be a copy of the first classifier, may then generate the pseudo-label (e.g., 235 in FIG. 3) based on the normalized second start embedding (e.g., 227 in FIG. 3).

In one implementation, the self-training loss comprises a cross-entropy loss between the pseudo-label subject to a pre-defined threshold and a predicted distribution corresponding to the predicted label. In one implementation, the self-training loss comprises a regularization component computed based on an entropy of an average prediction of the first classifier across a training batch.

At step 614, a decoder (e.g., 140a or 140n in FIG. 2) may generate predicted pixel values (e.g., 142a or 142n in FIG. 2) of the masked patches based on the one or more mask embeddings (e.g., 122a or 122n in FIG. 2).

At step 616, a masked image modeling loss may be computed by comparing the predicted pixel values (e.g., 142a or 142n in FIG. 2) of the masked patches and ground-truth pixel values (e.g., 145a or 145n in FIG. 2) of the masked patches.

At step 618, a global-local feature alignment loss may be computed based on a distance between the start embedding (e.g., 127 in FIG. 1) and the one or more mask embeddings (e.g., 128a or 128n in FIG. 1) in a normalized embedding space.

At step 620, a weighted sum of a self-training loss, a masked image modeling loss and the global-local feature alignment loss may be computed.

At step 622, the first encoder (e.g., 120 in FIG. 1), the decoder (e.g., 140a, 140n in FIG. 2) and the first classifier (e.g., 130 in FIG. 3) may be updated based on the weighted sum.

At step 624, an exponentially moving average of parameters of the updated first encoder, the decoder and the first classifier may be computed.

At step 626, a second encoder (e.g., 220 in FIG. 3), a second classifier (e.g., 230 in FIG. 3) may be updated with the computed exponentially moving average of parameters.

At step 630, method 600 may proceed to next training timestep to repeat at step 602. If the training is completed, method 600 may end at step 630.

Example Data Experiment Performance of MaST

Data experiments of the MaST framework and its operations described in FIGS. 1-6B are performed on 8 image classification datasets which span many different domains including common objects (ImageNet, Caltech101), fine-grained animals (Oxford Pets), indoor and outdoor scenes (SUN397), foods (Food101), traffic signs (GTSRB), natural textures (DTD), and human actions (UCF101). FIG. 7 shows the detailed information of each dataset: ImageNet described in Deng et al., Imagenet: A large-scale hierarchical image database, in proceedings of Computer Vision and Pattern Recognition (CVPR), pages 248-255, 2009; SUN397 described in Xiao et al., SUN database: Large-scale scene recognition from abbey to zoo, in proceedings of CVPR, 2010; Food101 described in Bossard et al., Food-101—mining discriminative components with random forests, in proceedings of European Conference on Computer Vision (ECCV), 2014; GTSRB described in Stalkamp et al., The german traffic sign recognition benchmark: A multi-class classification competition, in proceedings of International Joint Conference on Neural Network, 2011; DTD described in Cimpoi et al., Describing textures in the wild, in proceedings of CVPR, 2014; UCF101 described in Soomro et al., UCF101: A dataset of 101 human actions classes from videos in the wild, arXiv preprint arXiv:1212.0402, 2012; Oxford Pets described in Parkhi et al., Cats and dogs, in proceedings of CVPR, 2012; and Caltech101 described in Binh et al., Online multiple tasks one-shot learning of object categories and vision, in proceedings of Mobile Computing and Multimedia, 2011.

FIG. 8 shows the zero-shot classification results on 6 tasks. MaST substantially improves upon the baseline CLIP on all tasks with an average accuracy improvement of +10.8%/+8.4% for ViT-B/ViT-L. Another experiment is carried on a widely-adopted supervised learning approach: supervised pre-training on ImageNet (1k or 21k) followed by supervised finetuning on the downstream tasks. The ImageNet model is finetuned with the same number of epochs and the same data augmentation as MaST. Compared to the label-intensive supervised learning, unsupervised MaST achieves comparable performance on some datasets (e.g., Food101 and UCF101), and lags behind on some datasets (e.g., GTSRB and DTD) where the low accuracy of CLIP limits the effectiveness of self-training. Despite this, MaST can close the performance gap between unsupervised and supervised learning by around 50%.

As the [MSK] token and linear decoder are trained from scratch, the potential of MaST may not be fully exploited for downstream tasks with limited number of unlabeled images. To address this, it is implemented to warm-up the model by training it on a similar domain with more unlabeled images. Specifically, MaST is first employed to finetune a CLIP ViT-B model on ImageNet for a single epoch, and then continue to be finetuned on two different datasets with limited number of samples (Pets and Caltech101). During warmup, the linear classifier is frozen (i.e., CLIP's text embeddings) to anchor the normalized image embeddings in their original space for easier transfer. As shown in FIG. 9, warmup on ImageNet improves the performance of MaST on both datasets.

Data experiments are further held to study the effect of the three objectives: self-training, mask image modeling, and global-local feature alignment. The results are shown in FIG. 10. Removing the alignment loss reduces the average zero-shot accuracy by 1.4%, and removing MIM further decreases accuracy by 0.8%. The results demonstrate the importance to align the features of [CLS] and [MSK] tokens, which regularizes the model to learn better global features for classification.

Number of [MSK] tokens to align with are experimented. The global-local feature alignment loss aims to align the [CLS] token to all of the [MSK] tokens for an image. The alignment strength may be relaxed by only using the 10 [MSK] tokens that are nearest to the [CLS] token in the embedding space. As shown in FIG. 11, using the nearest-10 [MSK] tokens leads to similar performance compared to using all [MSK] tokens, which suggests that MaST is robust to the strength of alignment.

Effect of fairness regularization is also experimented. The fairness regularization loss $L_{reg}$ is used to counteract the bias in pseudo-labels. In FIG. 12, its effect is examined on the self-training objective. Data experiments use $L_{reg}$ with a constant weight of 1. The regularization improves the performance of self-training on all datasets except for SUN397, which has a long-tailed class distribution in its training set. $L_{reg}$ can be made beneficial on SUN397 by simply reducing the weight of $L_{reg}$ to 0.2, which leads to a self-training accuracy of 71.4%.

Figure 13:
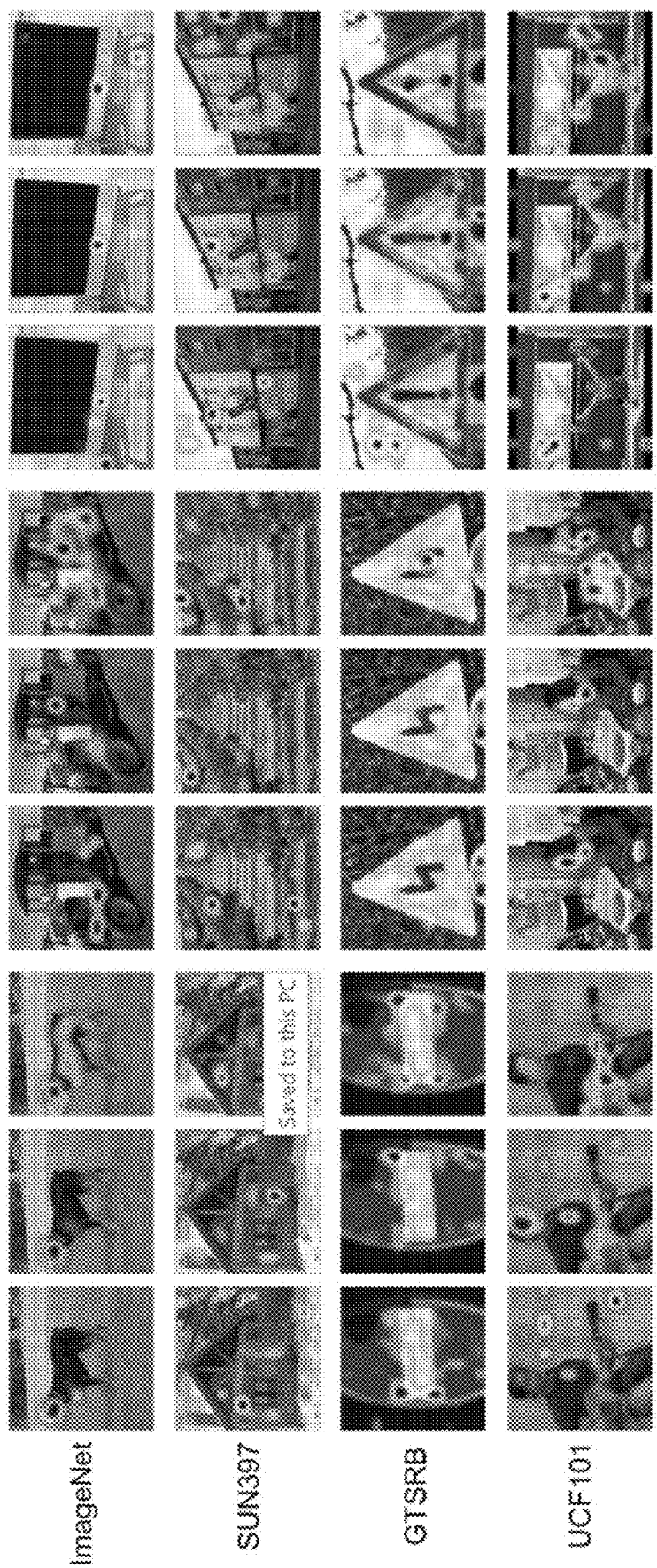

MaST framework may pay attention to more informative regions. FIG. 13 visualizes the GradCAM heatmap for the self-attention from [CLS] to all patches in the last ViT layer. The three models—CLIP, Self-Training (ST), MaST—and make the following qualitative observations: (1) MaST generally relies on more patches to make predictions, e.g., the fully body of the dog instead of only the head in row 1 column 1; all four corners of the traffic sign in row 3 column 1. (2) MaST can better leverage the true correlation between patches and class labels, instead of the spurious correlations used by CLIP and ST, e.g., the guitar is attended for the action "playing guitar" in row 4 column 1, instead of the person or the background.

Figure 14:
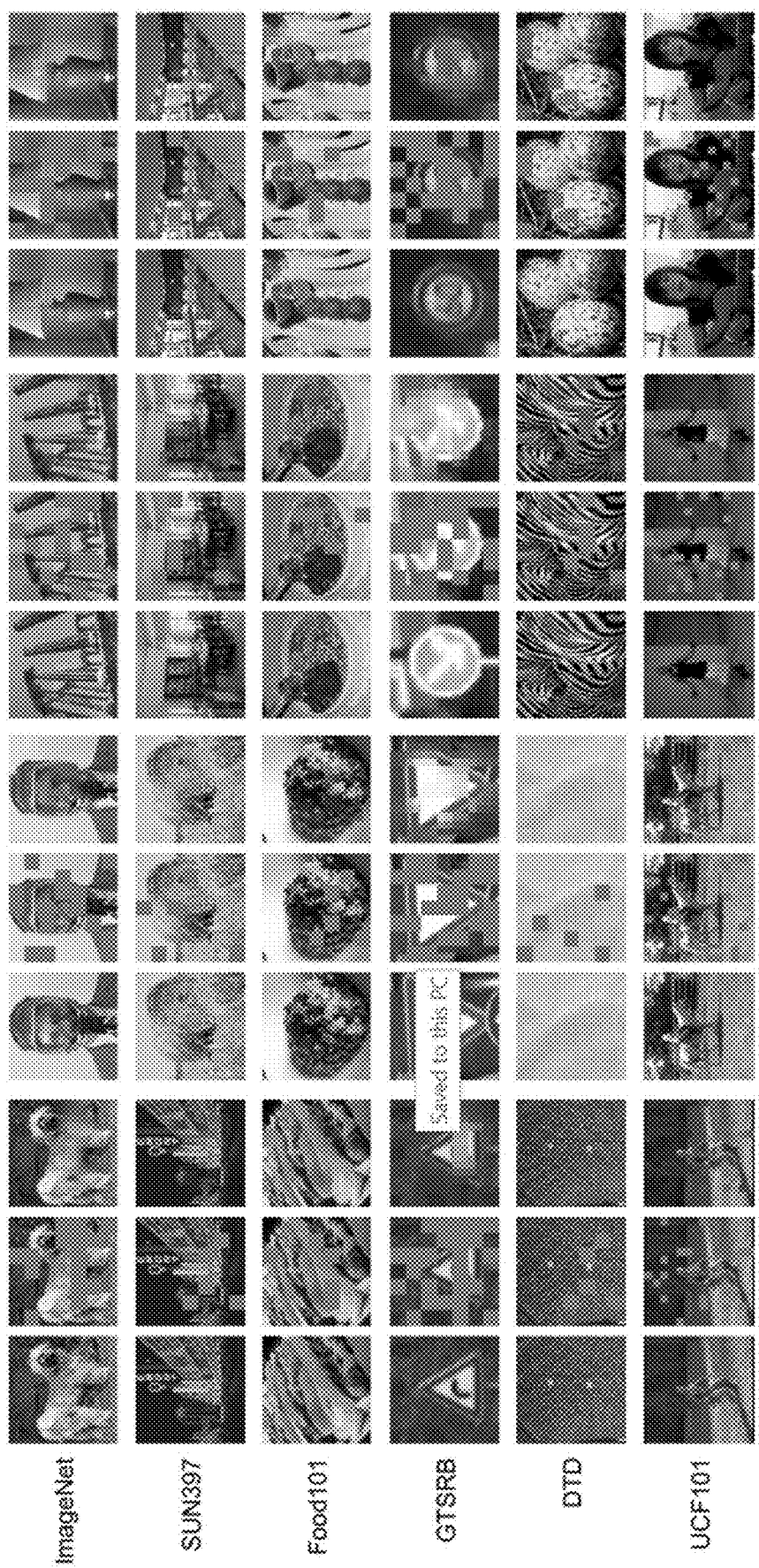

A helpful MIM is not necessarily good at image recovery. FIG. 14 shows examples of recovered images from the MIM output on the validation set of different tasks. On some datasets with abundant samples (e.g., ImageNet), the model learns to recover masked patches with good quality. On other datasets with fewer number of samples (e.g., GTSRB), the recovered images have poorer quality with many artifacts. Despite this, the MIM objective still provides useful supervision that helps the model learn better features for image classification.

FIG. 15 shows the robustness of MaST to image corruptions. The performance of ImageNet-finetuned models are evaluated on the ImageNet-C benchmark, which contains 15 corruption types. MaST leads to a lower mean corruption error (mCE) compared to both CLIP and ST, and is only slightly higher than a model that is trained with MAE first followed by supervised finetuning on ImageNet.

The robustness of MaST is further experimented under natural distribution shifts. Three ImageNet-like datasets are used: ImageNetV2 (described in Recht et al., Do imagenet classifiers generalize to imagenet?, in proceedings of International Conference on Machine Learning (ICML), 2019) with the same 1000 ImageNet classes, ImageNet-Rendition (described in Hendrycks et al., The many faces of robustness: A critical analysis of out-of-distribution generalization, in proceedings of ICCV, 2021) and ImageNet-Adversarial (described in Hendrycks et al., Natural adversarial examples, in proceedings of CVPR, 2021) where each contains a subset of 200 classes (see FIG. 17 for example images).

First, it is directly evaluated a ViT-B model finetuned on ImageNet using MaST, which has 77.7% accuracy on ImageNet validation set. As shown in FIG. 16, MaST on ImageNet improves the zero-shot classification accuracy on ImageNetV2, but decreases the performance on ImageNet-R and ImageNet-A. To address this, transductive transfer learning is performed with MaST, which uses unlabeled test images to jointly learn model parameters and infer image labels. The results in FIG. 16 shows that transductive MaST substantially improves the model's accuracy to distribution shift. Furthermore, warmup on ImageNet before transductive learning leads to more improvement.

FIG. 18 shows additional hyperparameters for MaST on the downstream datasets with the ViT-B/16 (B) and ViT-L/14 (L).

This description and the accompanying drawings that illustrate inventive aspects, embodiments, implementations, or applications should not be taken as limiting. Various mechanical, compositional, structural, electrical, and operational changes may be made without departing from the spirit and scope of this description and the claims. In some instances, well-known circuits, structures, or techniques have not been shown or described in detail in order not to obscure the embodiments of this disclosure. Like numbers in two or more figures represent the same or similar elements.

In this description, specific details are set forth describing some embodiments consistent with the present disclosure. Numerous specific details are set forth in order to provide a thorough understanding of the embodiments. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

Although illustrative embodiments have been shown and described, a wide range of modification, change and substitution is contemplated in the foregoing disclosure and in some instances, some features of the embodiments may be employed without a corresponding use of other features. One of ordinary skill in the art would recognize many variations, alternatives, and modifications. Thus, the scope of the invention should be limited only by the following claims, and it is appropriate that the claims be construed broadly and in a manner consistent with the scope of the embodiments disclosed herein.

What is claimed is:

1. A method of masked self-training for image classification, the method comprising:
   receiving, via a communication interface, an image
   dividing the image into a plurality of image patches;
   randomly replacing one or more image patches with a mask token;
   encoding, via a first encoder, the plurality of image patches including one or more masked patches and a first start token into a first start embedding and a plurality of image embeddings including one or more mask embeddings;
   normalizing, by a linear projection layer, the first start embedding and the one or more mask embeddings;
   computing a global-local feature alignment loss based on an average squared distance between the normalized first start embedding and the normalized one or more mask embeddings; and
   updating the first encoder based at least in part on the global-local feature alignment loss.

2. The method of claim 1, further comprising:
   generating, via a first classifier, a predicted label based on the normalized first start embedding;
   computing a self-training loss by comparing the predicted label and a pseudo-label generated using the image without being masked.

3. The method of claim 2, wherein the pseudo-label is generated by:
   encoding, via a second encoder, the plurality of image patches and a second start token into a second start embedding;
   normalizing the second start embedding;
   generating, via a second classifier, the pseudo-label based on the normalized second start embedding.

4. The method of claim 2, wherein the self-training loss comprises a cross-entropy loss between the pseudo-label subject to a pre-defined threshold and a predicted distribution corresponding to the predicted label.

5. The method of claim 2, wherein the self-training loss comprises a regularization component computed based on an entropy of an average prediction of the first classifier across a training batch.

6. The method of claim 1, further comprising:
   generating, via a decoder, predicted pixel values of the masked patches based on the one or more mask embeddings;
   computing a masked image modeling loss by comparing the predicted pixel values of the masked patches and ground-truth pixel values of the masked patches.

7. The method of claim 1, further comprising:
   computing a weighted sum of a self-training loss, a masked image modeling loss and the global-local feature alignment loss; and
   jointly updating the first encoder based on the weighted sum.

8. The method of claim 7, further comprising:
   computing an exponentially moving average of parameters of the updated first encoder; and
   updating a second encoder with the computed exponentially moving average of parameters.

9. The method of claim 1, wherein the first encoder is an image encoder pretrained by:
   encoding, by the image encoder, a training image into an image embedding;
   encoding, by a text encoder, a training text paired with the training image into a text embedding;
   converting the text embedding into weights of a linear classifier; and
   computing a contrastive loss comparing the image embedding with a classification of the linear classifier; and
   updating the image encoder and the linear classifier based on the contrastive loss.

10. The method of claim 9, wherein the training text paired with the training image is an ensemble of natural language prompts based on a set of class names.

11. A system of masked self-training for image classification, the system comprising:
    a communication interface that receives an image;
    a processor; and
    a memory storing a plurality of processor-executable instructions read by the processor to perform operations comprising:
       dividing the image into a plurality of image patches;
       randomly replacing one or more image patches with a mask token;
       encoding, via a first encoder, the plurality of image patches including one or more masked patches and a first start token into a first start embedding and a plurality of image embeddings including one or more mask embeddings;
       normalizing, by a linear projection layer, the first start embedding and the one or more mask embeddings;
       computing a global-local feature alignment loss based on an average squared distance between the normalized first start embedding and the normalized one or more mask embeddings; and
       updating the first encoder based at least in part on the global-local feature alignment loss.

12. The system of claim 11, wherein the operations further comprise:
    generating, via a first classifier, a predicted label based on the normalized first start embedding;
    computing a self-training loss by comparing the predicted label and a pseudo-label generated using the image without being masked.

13. The system of claim 12, wherein the pseudo-label is generated by:
    encoding, via a second encoder, the plurality of image patches and a second start token into a second start embedding;
    normalizing the second start embedding;
    generating, via a second classifier, the pseudo-label based on the normalized second start embedding.

14. The system of claim 12, wherein the self-training loss comprises a cross-entropy loss between the pseudo-label subject to a pre-defined threshold and a predicted distribution corresponding to the predicted label.

15. The system of claim 12, wherein the self-training loss comprises a regularization component computed based on an entropy of an average prediction of the first classifier across a training batch.

16. The system of claim 11, wherein the operations further comprise:
    generating, via a decoder, predicted pixel values of the masked patches based on the one or more mask embeddings;
    computing a masked image modeling loss by comparing the predicted pixel values of the masked patches and ground-truth pixel values of the masked patches.

17. The system of claim 11, wherein the operations further comprise:
    computing a weighted sum of a self-training loss, a masked image modeling loss and the global-local feature alignment loss; and
    jointly updating the first encoder based on the weighted sum.

18. The system of claim 17, wherein the operations further comprise:
    computing an exponentially moving average of parameters of the updated first encoder; and
    updating a second encoder with the computed exponentially moving average of parameters.

19. The system of claim 11, wherein the first encoder is an image encoder pretrained by:
    encoding, by the image encoder, a training image into an image embedding;
    encoding, by a text encoder, a training text paired with the training image into a text embedding;
    converting the text embedding into weights of a linear classifier; and
    computing a contrastive loss comparing the image embedding with a classification of the linear classifier; and
    updating the image encoder and the linear classifier based on the contrastive loss,
    wherein the training text paired with the training image is an ensemble of natural language prompts based on a set of class names.

20. A processor-readable non-transitory storage medium storing a plurality of processor-executable instructions masked self-training for image classification, the instructions executed by a processor to perform operations comprising:
    receiving, via a communication interface, an image;
    dividing the image into a plurality of image patches;
    randomly replacing one or more image patches with a mask token;
    encoding, via a first encoder, the plurality of image patches including one or more masked patches and a first start token into a first start embedding and a plurality of image embeddings including one or more mask embeddings;
    normalizing, by a linear projection layer, the first start embedding and the one or more mask embeddings;
    computing a global-local feature alignment loss based on an average squared distance between the normalized first start embedding and the normalized one or more mask embeddings; and
    updating the first encoder based at least in part on the global-local feature alignment loss.

* * * * *